United States Patent [19]

Stuart

[11] Patent Number: 5,542,652
[45] Date of Patent: Aug. 6, 1996

[54] ANTI-FRICTION PAD FOR A BUSHED PIVOT POINT CONNECTION OF A MAIN LEAF SPRING AND A SECONDARY LEAF SPRING

[75] Inventor: John W. Stuart, Springfield, Mo.

[73] Assignee: Reyco Industries, Inc., Springfield, Mo.

[21] Appl. No.: 392,047

[22] Filed: Feb. 22, 1995

[51] Int. Cl.$^6$ .................................................. B60G 11/02
[52] U.S. Cl. ................................................ 267/49; 267/269
[58] Field of Search .......................... 267/37.4, 49, 260, 267/264, 268, 269, 30; 280/694, 699, 718, 712

[56] References Cited

U.S. PATENT DOCUMENTS

| | | | |
|---|---|---|---|
| 1,327,063 | 1/1920 | Rigby . | |
| 2,649,296 | 8/1953 | Dow | 267/49 |
| 3,159,389 | 12/1964 | Clary | 267/49 X |
| 3,841,655 | 10/1974 | Schaeff | 267/269 X |
| 4,132,433 | 1/1979 | Willetts | 280/712 |
| 5,088,758 | 2/1992 | Wall et al. | 280/683 |
| 5,346,247 | 9/1994 | Snyder | 280/712 |
| 5,362,095 | 11/1994 | Eveley | 267/269 |

Primary Examiner—Robert J. Oberleitner
Assistant Examiner—Peter M. Poon
Attorney, Agent, or Firm—Dorn, McEachran, Jambor & Keating

[57] ABSTRACT

An anti-friction pad for a bushed pivot connection of a main leaf spring and a secondary leaf spring of a spring mounted air spring suspension of a vehicle. The pivot connection includes a bushing, a main leaf spring having an eye receiving the bushing and a secondary leaf spring having an eye receiving the eye of the main leaf spring and the inside surfaces of bushing hanger bracket. The anti-friction pad has an elongated main body portion positioned between and in contact with the main leaf spring and the secondary leaf spring. The anti-friction pad also has side walls which engage the secondary leaf spring. The anti-friction pad has a center post which seats in a socket of the secondary leaf spring. The main body portion of the pad has an outer convex surface which mates with a concave face of the main leaf spring. The anti-friction pad is formed of an ultra high molecular weight polyethylene.

10 Claims, 2 Drawing Sheets

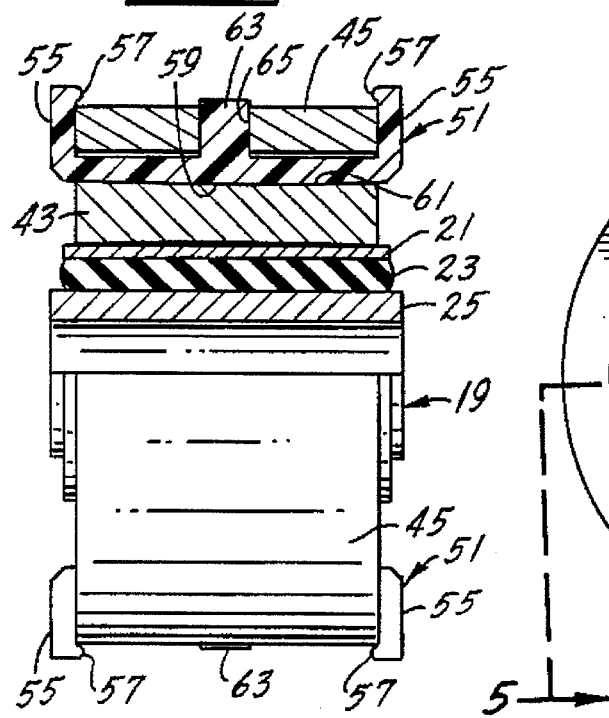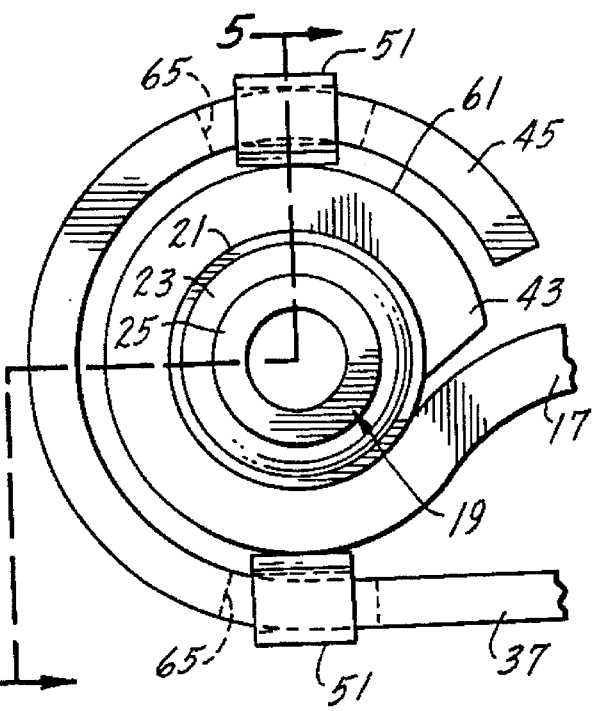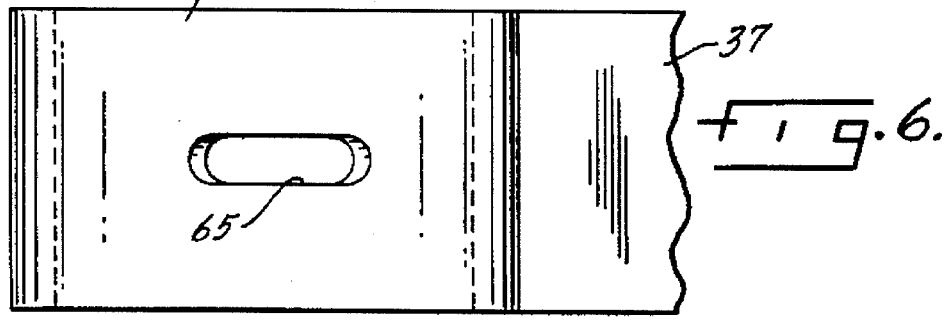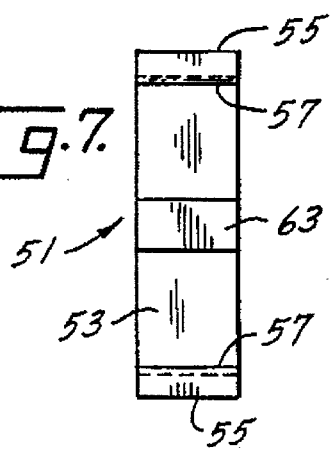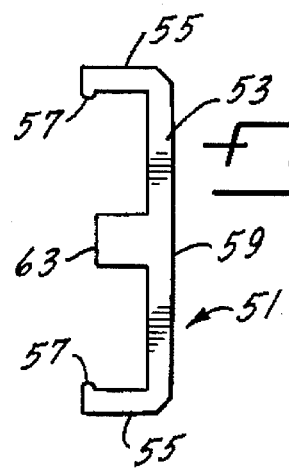

ANTI-FRICTION PAD FOR A BUSHED PIVOT POINT CONNECTION OF A MAIN LEAF SPRING AND A SECONDARY LEAF SPRING

BACKGROUND AND SUMMARY OF THE INVENTION

This invention is directed to an anti-friction pad for a bushed pivot point connection of a main leaf spring and a secondary leaf spring of a spring supported air spring suspension of a vehicle. Such suspensions are frequently used with rigid-beam steer axles in which the main leaf spring acts as a trailing arm supporting fore and aft and lateral loads. When installed between an air spring and an axle, the main spring also provides roll stability. The main leaf spring attaches to a forwardly located hanger bracket having a bushed pivot point connection. The hanger bracket and the main leaf spring attach and position the axle to the vehicle chassis. A secondary leaf spring wraps around the pivot eye of the main leaf spring and attaches to the axle by means of a spring/axle bracket at its opposite end. If the eye of the secondary leaf spring is wrapped too loosely around the eye of the main leaf spring, rattling is caused by the interaction between the secondary leaf spring and the main leaf spring and by the interaction between the secondary leaf spring and the hanger bracket. Attempts to correct this rattling and noise created thereby through the use of a lubricated fitting provides only a temporary solution.

Accordingly, an object of this invention is an anti-friction pad for use in concentric pivot eyes of a main leaf spring and a secondary leaf spring of a bushed pivot point connection which eliminates squeaking and rattling without requiring a lubricated fitting.

Another object of this invention is an anti-friction pad for concentric pivot eyes of a main leaf spring and a secondary leaf spring which improves lateral stability and roll stability of the suspension by tightening the fit between the pivot eyes and their hanger bracket.

Yet another object of this invention is an anti-friction pad for installation in the concentric pivot eyes of a main leaf spring and a secondary leaf spring bushed connection which is formed of an ultra high molecular weight polyethylene.

Still another object of this invention is an anti-friction pad for a bushed pivot point connection of concentric pivot eyes of a main leaf spring and a secondary leaf spring which are supported on a hanger bracket which pad eliminates contact noises and wear between the eyes and the hanger bracket.

Other objects may be found in the following specification, drawings and claims.

BRIEF DESCRIPTION OF THE DRAWINGS

The invention is illustrated more or less diagrammatically in the following drawings wherein:

FIG. 4 is an enlarged partial side elevational view of the bushed pivot point connection, with parts omitted for clarity, utilizing the anti-friction pads of this invention;

FIG. 5 is a cross sectional view taken along line 5—5 of FIG. 4;

FIG. 6 is an enlarged partial top plan view of the secondary leaf spring of this assembly;

FIG. 7 is a top plan view of the anti-friction pad of this invention; and

FIG. 8 is an end elevational view of the pad of FIG. 7.

DESCRIPTION OF THE PREFERRED EMBODIMENT

Figure 1:
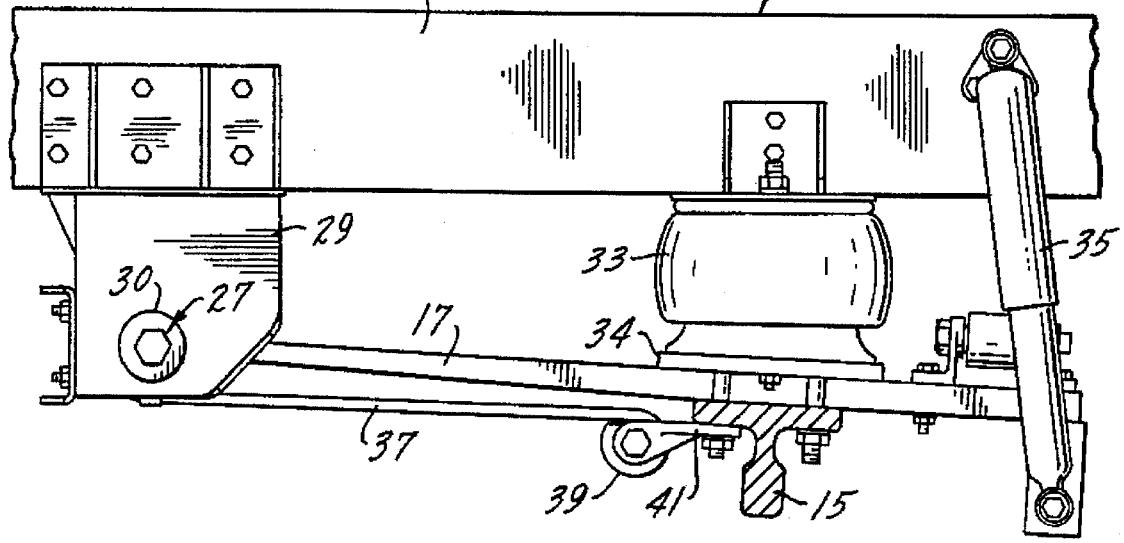
FIG. 1 is a partial side elevational view of an air spring mounting suspension for a vehicle incorporating the anti-friction pad of this invention with some parts shown in cross section.
Figure 2:
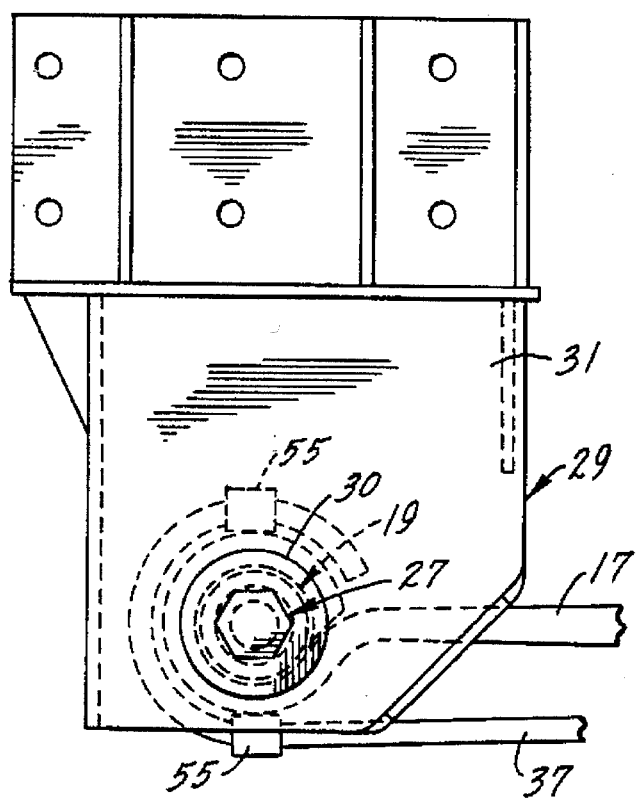
FIG. 2 is an enlarged partial view of the hanger bracket of FIG. 1 with some parts shown in hidden lines and others broken away.

FIG. 1 of the drawings shows a portion of a vehicle frame 11 including a side beam 13, which in this instance is the left hand side of the vehicle, on which is mounted an axle 15. The axle 15 is attached to a main leaf spring 17 near the trailing end thereof. The main leaf spring 17 is pivotally connected at its forward end to a bushing 19 shown in more detail in FIGS. 2, 3, 4 and 5 of the drawings. The bushing 19 includes an outer sleeve 21 of steel, an intermediate sleeve 23 of rubber and an inner sleeve 25 of steel. A pivot pin and locknut assembly 27 mounts the bushing 19 to the lower end of a hanger bracket 29 which is attached to the side beam 13. The pivot pin extends through openings in reinforcing bosses 30 welded to the outsides of the walls 31 of the hanger bracket and through the inner sleeve 25 of the bushing 19. Tightening of the pivot pin and locknut assembly 27 applies a clamping load to the inner sleeve 25 thus holding the bushing 19 in place. An air spring 33 and its support 34 connect the side beam 13 to the main leaf spring 17 and axle 15 in a conventional manner. Also, as is conventional, a shock absorber 35 is connected between the main leaf spring 17 and the side beam 13 rearwardly of the air spring 33.

A secondary leaf spring 37 is also pivotally attached to the bushing 19 and has a smaller eye 39 pivotally connected to a bracket 41 attached to the axle 15. The larger eye 43 of the main leaf spring encircles the bushing 19 as best shown in FIG. 4 of the drawings and it in turn is encircled by a larger eye 45 of the secondary leaf spring 37 also as shown in FIG. 4 of the drawings.

Figure 3:
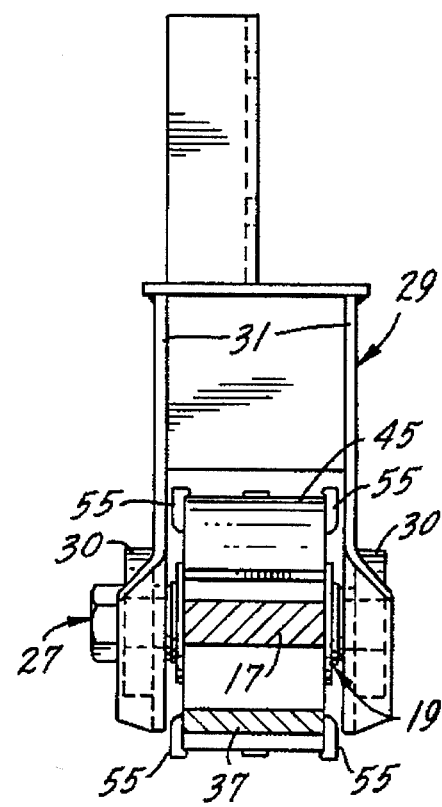
FIG. 3 is an end elevational view of the structure of FIG. 2.

The anti-friction pads 51 of this invention are carried by the eye 45 of the secondary leaf spring 37 at locations which are positioned 180° apart so that the anti-friction pads engage the eye 43 of the main leaf spring. As best shown in FIG. 7 of the drawings, the anti-friction pad 51, which is formed of an ultra high molecular weight polyethylene, has a main body portion 53, upstanding end walls 55 which are located laterally outwardly of the secondary leaf spring eye 45 as shown in Fig. 3 of the drawings, and inwardly projecting lips 57 at the upstanding portions of the end walls 55. The main purpose of the lips 57 is to hold the anti-friction pads 51 in position when they are first mounted on the secondary leaf spring eye 45. The end walls 55 of the pad 51, by sometimes engaging the inner surfaces of the walls 31 of the hanger bracket 29, reduce lateral movement between the eye 45 of the secondary leaf spring and the hanger bracket 29 and thus improves both lateral stability and roll stability of the suspension. The main body portion 53 of the anti-friction pad 51 has a convex side wall 59 which is complementary to the concave side wall 61 of the main leaf spring 17 with this concave side wall being the outer wall of the eye 43 of the main leaf spring. Also formed integrally with the main body portion 53 of the anti-friction pad is a center post 63 which is elongated and seats in an elongated slot 65 formed in the eye 45 of the secondary leaf spring 37 with the slots 65 being formed approximately 180° apart on the eye 45 of the secondary leaf spring 37.

I claim:

1. An anti-friction pad adapted to be fitted in a pivot eye of a bushed pivot connection of a main leaf spring and a secondary leaf spring mounted between the walls of a hanger bracket, said anti-friction pad including an elongated main body portion having oppositely located faces and having a length which is greater than its width with said main body portion adapted to be fitted in said pivot eye so that its length extends transversely of said pivot eye, said main body portion adapted to be fitted between said main leaf spring and said secondary leaf spring with one of said faces engaging said main leaf spring and the other of said faces engaging said secondary leaf spring, side walls formed integrally with said main body portion and upstanding from said main leaf spring engaging face with said side walls located at opposite ends of said main body portion, each of said side walls having oppositely located faces, one of said side wall faces adapted to be fitted in engagement with said secondary leaf spring and the other of said side wall faces adapted to be fitted to engage one of said hanger bracket walls upon lateral movement of said bushed pivot connection.

2. The anti-friction pad of claim 1 in which said pad is formed of an ultra high molecular weight polyethylene.

3. The anti-friction pad of claim 1 including a center post upstanding from said main leaf spring engaging face and located between said side walls of said main body portion.

4. The anti-friction pad of claim 1 in which said face of said elongated main body portion of said pad which engages said main leaf spring is concave in shape to mate with a complementary face of said main leaf spring.

5. The anti-friction pad of claim 1 further including lips formed on said side walls and adapted to be fitted to engage said secondary leaf spring.

6. A bushed pivot connection of a main leaf spring and a secondary leaf spring of a vehicle suspension, said bushed pivot connection including:

a bushing, a main leaf spring having an eye receiving and encircling said bushing, a secondary leaf spring having an eye receiving and encircling said eye of said main leaf spring, a pair of anti-friction pads installed in said bushed pivot connection at locations diametrically opposite of each other, , each of said anti-friction pads having an elongated main body portion which is longer than it is wide and installed with the length thereof extending transversely of at least one of said eyes, each of said anti-friction pads being positioned with its main body portion located between said main leaf spring and said secondary leaf spring, side walls formed integrally with said main body portion of each anti-friction pad with said side walls extending radially outwardly from said main body portion to receive said secondary leaf spring.

7. The bushed pivot connection of claim 6 in which said anti-friction pad is formed of an ultra high molecular weight polyethylene.

8. The bushed pivot connection of claim 6 in which sockets are formed in said secondary leaf spring and each of said anti-friction pads includes a center post which seats in one of said sockets.

9. The bushed pivot connection of claim 6 in which an outer face of said main body portion of each anti-friction pad is convex in shape to mate with a complementary face of said main leaf spring.

10. The bushed pivot connection of claim 6 in which lips are formed on said side walls of each of said anti-friction pads with said lips adapted to be fitted to engage said secondary leaf spring.

* * * * *